United States Patent
Gupta et al.

(10) Patent No.: US 7,707,298 B2
(45) Date of Patent: Apr. 27, 2010

(54) SECURE SHARING OF LOB BOUND INFORMATION IN CLIENT APPLICATIONS

(75) Inventors: Rakesh Gupta, Hyberabad (IN); Shyam J. Sundar, Hyberabad (IN); Namendra Kumar, Hyberabad (IN); Burra Gopal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 348 days.

(21) Appl. No.: 11/746,757

(22) Filed: May 10, 2007

(65) Prior Publication Data

US 2008/0281972 A1 Nov. 13, 2008

(51) Int. Cl.
G06F 15/16 (2006.01)
G06F 15/173 (2006.01)
(52) U.S. Cl. .................. 709/229; 709/223; 709/224
(58) Field of Classification Search ......... 709/223–226, 709/229
See application file for complete search history.

(56) References Cited

U.S. PATENT DOCUMENTS

| 6,389,420 | B1 * | 5/2002 | Vahalia et al. ................ 707/8 |
| 6,920,507 | B1 * | 7/2005 | Kley et al. ................ 709/248 |
| 7,047,240 | B2 * | 5/2006 | Sato ............................. 707/8 |
| 7,185,066 | B2 | 2/2007 | Noble et al. |
| 7,246,119 | B2 * | 7/2007 | Kuwata et al. ................. 707/8 |
| 7,269,683 | B1 * | 9/2007 | Vaghani et al. ............... 711/4 |
| 7,313,557 | B1 * | 12/2007 | Noveck ......................... 707/8 |
| 7,315,926 | B2 * | 1/2008 | Fridella et al. .............. 711/163 |
| 7,444,337 | B2 * | 10/2008 | Zhou et al. .................... 707/10 |
| 7,444,349 | B1 * | 10/2008 | Ochotta ....................... 707/102 |
| 7,487,228 | B1 * | 2/2009 | Preslan et al. ................ 709/219 |
| 7,562,110 | B2 * | 7/2009 | Miloushev et al. ......... 709/201 |
| 2002/0052769 | A1 | 5/2002 | Navani et al. |
| 2003/0065722 | A1 | 4/2003 | Ieperen |
| 2004/0103147 | A1 | 5/2004 | Flesher et al. |
| 2004/0103280 | A1 | 5/2004 | Balfanz et al. |
| 2004/0186997 | A1 | 9/2004 | Todaka |
| 2005/0204142 | A1 | 9/2005 | Axelsson |
| 2006/0177061 | A1 | 8/2006 | Orsini et al. |

OTHER PUBLICATIONS

Secure Information Sharing Using Role-based Delegation, Gail-Joon Ahn, et al (6 pgs.); http://ieeexplore.ieee.org/iel5/9035/28683/01286758.pdf?isNumber=.

VegaFS: A Prototype for File-Sharing Crossing Multiple Administrative Domains, Wei Li, et al., (8 pgs.); http://ieeexplore.ieee.org/iel5/8878/28041/01253319.pdf?isNumber=.

(Continued)

Primary Examiner—Hussein Elchanti
(74) Attorney, Agent, or Firm—Merchant & Gould P.C.

(57) ABSTRACT

Secure sharing of bound information is enabled in client applications associated with a backend LOB service. Bound item IDs are assigned to newly created bound items by a client, the items synchronized with the LOB system, a correlation ID received in response to the synchronization, and the two IDs mapped. A reverse sequence of actions is performed when the LOB service creates the bound item. In response to an attempt by a client to exchange bound information, the item is placed in a pending state and allowed to be received by a receiver upon successful completion of data transfer and LOB system permission of the exchange passing the bound item ID and the correlation ID. If the LOB system rejects the exchange, the item is placed in an unbound state and the receiver not allowed to receive the bound information.

20 Claims, 6 Drawing Sheets

OTHER PUBLICATIONS

A Safe Information Sharing Framework for E-Government Communication, Fillia Makedon, et al., pp. 1-13; http://www.ists.dartmouth.edu/library/sis0903.pdf.

Enabling Secure Ad-hoc Collaboration, Karlo Berket, et al (6 pgs.); http://www-unix.mcs.anl.gov/fl/flevents/wace/wace2003/material/wace-03-papers/berket.pdf.

* cited by examiner

SECURE SHARING OF LOB BOUND INFORMATION IN CLIENT APPLICATIONS

BACKGROUND

Applications that enable organizations to connect their desktop programs, such as collaborative applications, to line-of-business systems in an intuitive, cost-effective way may increase worker efficiency as well as employee satisfaction. By providing information workers with the information they need to make sound, timely business decisions, workers may become more productive and organizations more agile.

Collaborative applications are one of the commonly used tools for sharing information. A collaborative application may include scheduling, electronic mail exchange, task management, and other functionalities. Through networked environments, collaborative applications may enable users to share messages, appointments, tasks, meetings, and embedded objects such as files, images, and the like. While seamless sharing of information may increase efficiency in organizations, security and privacy concerns present a significant challenge for how these systems can be designed and configured.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to secure sharing of bound information in client applications associated with a backend LOB service. Bound item IDs may be assigned to newly created bound items in the client application, the items synchronized with the LOB system, a correlation ID received from the LOB system, and the two IDs mapped. A reverse sequence of actions may be performed when the LOB service creates the bound item. In response to an attempt by a client to exchange bound information, the bound item may be placed in a pending state and allowed to be received by a receiver upon successful completion of data transfer and LOB system permission of the exchange using the correlation ID in a message passing paradigm.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, bound information may be securely shared among clients of a collaborative application and an LOB backend system using message passing and identifier exchange without requiring changes in the LOB system or the client collaborative application. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
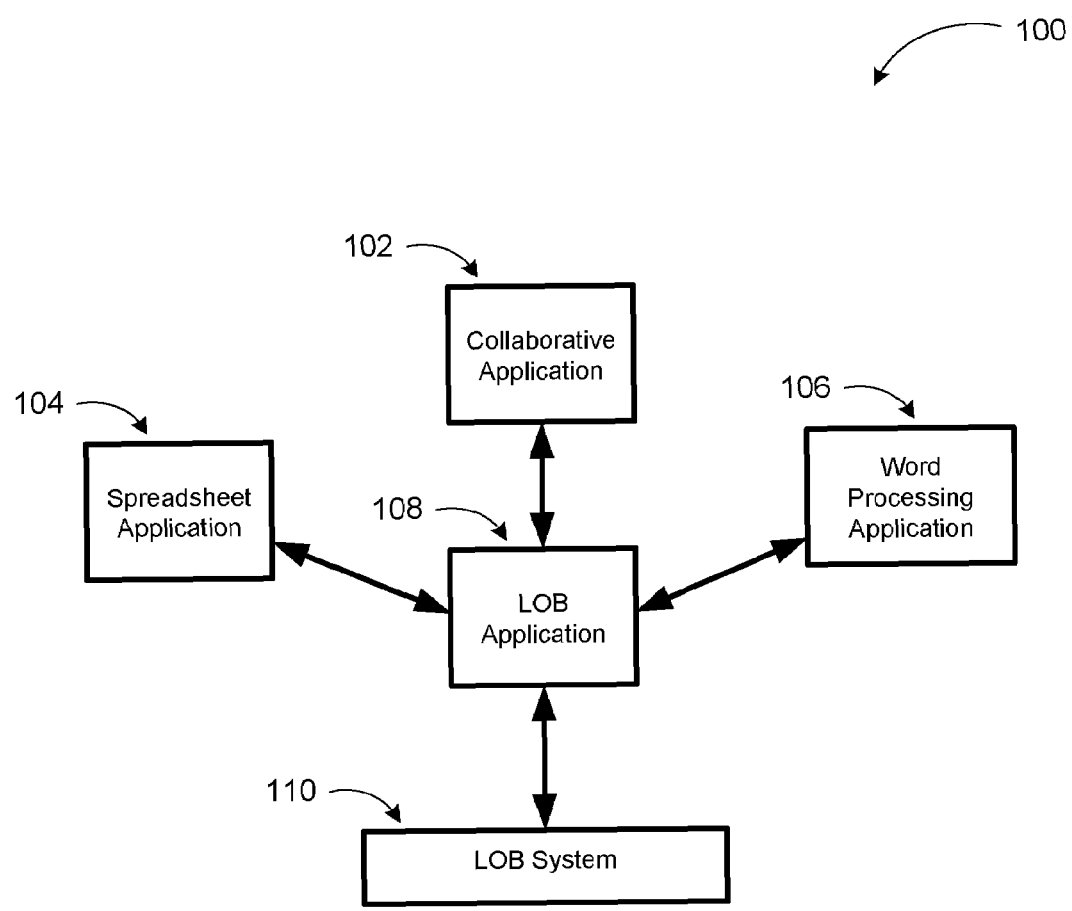
FIG. 1 illustrates an example architecture of a Line Of Business (LOB) service interacting with various desktop applications.

Referring to FIG. 1, example architecture 100 of a Line Of Business (LOB) service interacting with various desktop applications is illustrated. The LOB service may comprise one or more LOB applications supported by a backend LOB system (physical and virtual components such as LOB databases, interfaces, and the like). An LOB application is one of the set of critical computer applications that are vital to running an enterprise, such as accounting, supply chain management, and resource planning applications. LOB applications are usually large programs that contain a number of integrated capabilities and tie into databases and database management systems. Increasingly, LOB applications are being connected with network applications through user interfaces on the web and with personal applications such as e-mail and address books.

Users of common desktop applications such as collaborative application 102, spreadsheet application 104, and word processing application 106 in an enterprise system may interact with a backend LOB system 110 through one or more LOB applications (e.g. LOB application 108) providing input to the LOB system 110, retrieving data, analysis, reports, and the like. The term collaborative application is used to exemplify applications that perform scheduling, electronic mail exchange, task organization, contact management, and similar purposes LOB application 108 may facilitate exchange of "bound information" between LOB system 110 and client applications/solutions. Bound Information is defined as a piece of identifiable information (an object, a piece of data, a file, etc. with a unique name or identifier) that is directly visible to and under the control of an end user, but is also simultaneously tracked and maintained in a Line of Business (LOB) system. Bound information typically does not make sense outside the object or entity that contains it. Objects or entities on the client machine or application that contain bound information are also called bound items. Bound Items can be classified into a type system, where the term bound item type may be used to denote the type of the bound information in a bound item. Since bound information is also tracked by the LOB system, the assumption may be made that there is a corresponding object or entity on the LOB side containing the same bound information (albeit in a possibly different format than the client, and organized in a possibly different type system than the client), and the term correlation ID may be used to denote the identifier of that LOB object or entity. In some systems, a service-oriented architecture may be used where web services which are supplied by the LOB system are invoked, and the correlation ID is used as a parameter to identify the relevant bound information.

It should be noted that typical client applications/solutions may not understand correlation IDs. Additionally, LOB systems may not understand bound item IDs. This may create a problem when dealing with newly created client or LOB information. When a client creates a new bound item, it may automatically generate a bound item ID for it. When this item is synchronized with the LOB system, a "Create" web service may be called and the bound information passed as parameter. In response, the client may receive a correlation ID back. The bound item ID created by the client may then be mapped to the correlation ID returned by the LOB system. Similarly, when new bound information is created by the LOB system, the client may be notified of this new information. This notification may contain the information and its correlation ID. Bound item manager 214 may intercept this notification, create a new item on the client with a new bound item ID, insert the bound information from the notification into the newly created client item, and (again) map the bound item ID to the correlation ID. This way, bound item manager 214 ensures that neither subsystem (client application/solution) nor LOB system needs to know about each other's item identities or type systems.

Some of the important aspects of bound information are:
Business Processes: Bound Information may participate in prescriptive Line of Business processes and transactions, in addition to ad-hoc collaboration (which is common in end-user applications and tools).
Secure Storage/Compliance: Bound Information may be stored securely in a System of Record (SOR), and be managed according to corporate compliance policies. Bound Information may be encrypted on the client using a per-user key or other encryption mechanisms. To facilitate multiple clients of the same user to access the encrypted information, a roaming encryption algorithm may be implemented where the per-user key is accessible to multiple clients of a user via some configuration information in the roaming user's account on the server (e.g. Exchange server).
Multi-point access: Bound Information may be created, accessed, rendered, manipulated and updated both in the LOB system, as well as in the client using end user applications and tools (e.g. Microsoft Office from Microsoft Corp. of Redmond, Wash.). Hence, any changes to the bound information on either end (LOB or client applications) may be synchronized to ensure consistency and compliance.
Privacy/Confidentiality: Bound Information may contain private or confidential information that is prohibited (by law or corporate compliance policies) from being shared or distributed in a general purpose manner. In many cases, only the application that understands the content can determine whether the bound information or a portion of it can be shared and/or distributed.

Following are some example scenarios illustrating use of bound information in an enterprise system according to embodiments. According to one example scenario, a recruiter creates a template travel/interview plan and forwards it to his interviewing team, so that the members of the team can plan their trip to be present for interviews on the same day(s) as the recruiter. Each interviewer gets the travel plan and is able to see the details (reservations, hotels, rooms, interview schedule, etc.) planned by the recruiter. A new travel/interview plan may get created for each interviewer in the LOB system. For example, another interviewer has a travel plan created for her in the LOB system and represented as appointments in her collaborative application. The other interviewer can make changes to her appointments to customize her travel/interview plan in the LOB system.

According to another example scenario, a sales representative is planning to be out-of-office for 2 weeks. He shares his (bound) CRM customer contacts with his colleague, so that she can follow up on the related sales opportunities. The sales representative forwards the CRM contacts to his colleague through the collaborative application's standard forwarding functionality. The colleague receives the forwarded contacts and saves them as native items (items that do not have a correlation to the LOB service) in her contacts. A bound item manager may associate the colleague's bound contacts with the same LOB entities as the sales representative. When the colleague makes changes to the contact details and submits the change, the LOB CRM customer contact entity gets updated through a synchronization subsystem. The LOB system then updates the sales representative's copy of the contacts through the synchronization subsystem. Thus, copies of the same CRM contact can be manipulated by multiple users in a secure fashion, and kept in sync across multiple users.

According to a further example scenario, the recruiter needs to set up an interview. He creates an appointment item and makes it bound to the LOB system as an "interview item" type. He then sends the bound appointment to the interviewer and the candidate. The candidate is not authorized to look at the confidential information (like interview feedback, hire/no-hire recommendations, contact information of people in the interview loop, etc.) in the interview item, whereas the interviewer is. As described above, this authorization information is stored in the LOB system and used by the client solution. Accordingly, the candidate's interview item should be unbound upon receipt, but the interviewer's interview item should be bound. This automatic binding/unbinding may be managed by the synchronization sub-system by contacting the LOB for authorization information. Similarly, a manager may not be allowed to share his/her employee contact bound information with his team because it contains confidential information. If such a contact does get forwarded, then it may be automatically unbound at the receiver's client application.

An enterprise system that includes an LOB backend interacting with client applications/solutions may be implemented in many ways. The above described components and scenarios are exemplary for illustration purposes only. Secure sharing of LOB bound information among client applications and LOB systems may be implemented in other ways using the principles described herein.

Figure 2:
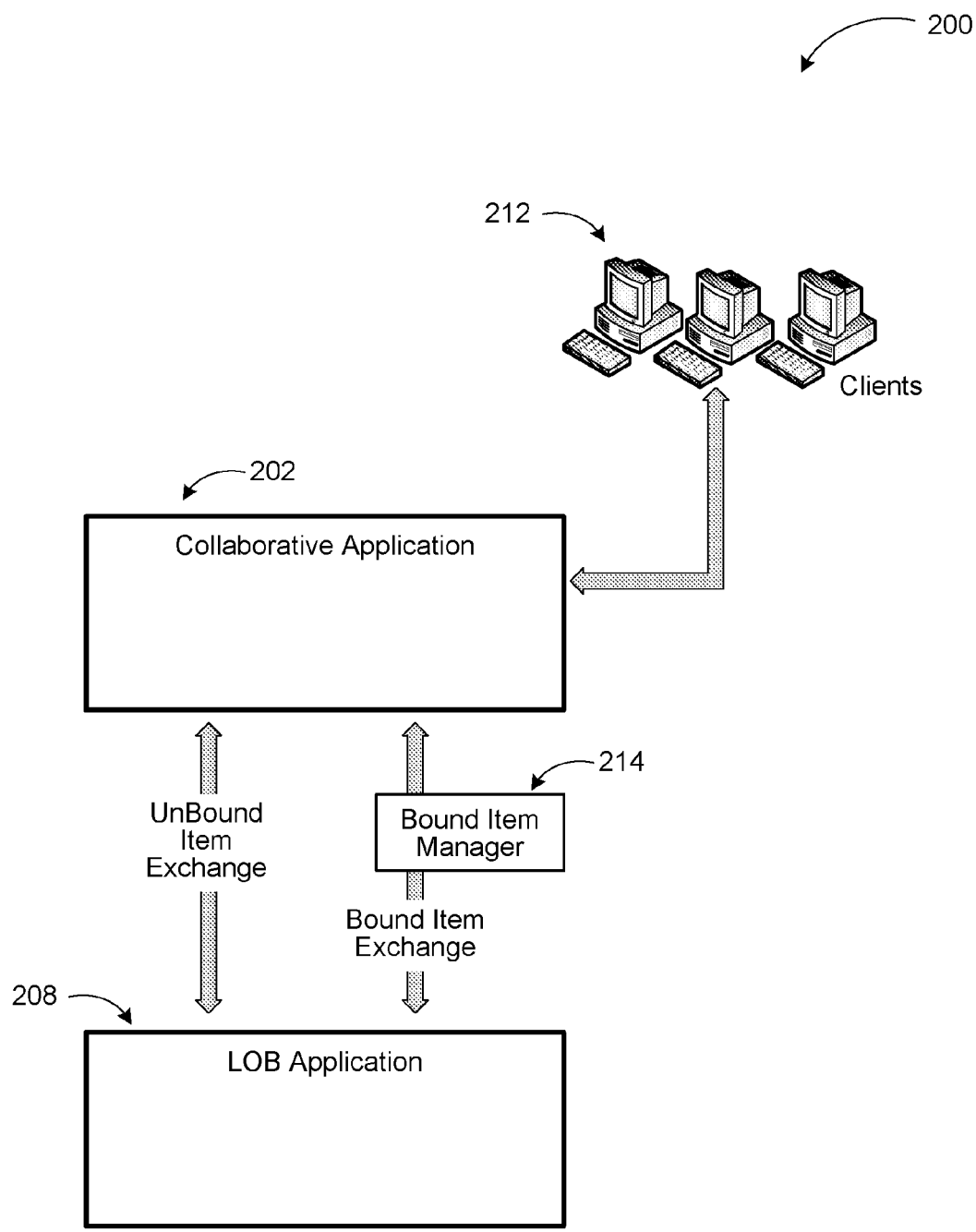
FIG. 2 illustrates example components of a system for securely sharing bound items in an LOB system using a collaborative application.

FIG. 2 illustrates example components of a system 200 for securely sharing bound items in an LOB system using a collaborative application. While specific names are used to define the example components, a system according to embodiments is not limited to the definitions and components described below. Secure sharing of LOB bound information among client applications and LOB systems may be provided using additional or fewer components with each component performing additional or fewer tasks.

In system 200, collaborative application 202 is used by various organizational users through clients 212 for scheduling, electronic mail exchange, task organization, contact management, and similar purposes. An example collaborative application is OUTLOOK® by MICROSOFT CORPORATION of Redmond, Wash., but the features described herein according to embodiments may be implemented in any collaborative application in conjunction with a LOB service.

As described in the example scenarios above, various bound items may be created and exchanged between the clients of the collaborative application 202 and the backend LOB service through LOB application 208. Unbound items may also be exchanged through traditional methods. A bound item manager module 214 (or application) may perform tasks associated with secure sharing of bound items, examples of which are listed above. Bound item manager 214 may include submodules for specific tasks such as a synchronization module for synchronizing bound items with the backend LOB service, a bound item create module for creating bound items, and the like.

According to some embodiments, the bound item manager may include an algorithm that relies on a message passing paradigm to share bound information, rather than a shared store paradigm, since each user's bound information may be encrypted and may not be sharable as-is. When message passing is used, the entire object or entity on the client machine or application/solution may be sent as a unit, since the bound information does not make sense outside the object or entity that contains it. The algorithm may further rely on communicates identifiers while helping users share bound information. Thus, instead of sharing actual bound information, identifiers bound item ID and correlation ID (as described above) may be shared.

An algorithm according to embodiments may not require the LOB system to understand or remember client/application specific IDs (i.e., the bound item ID, or maintain a mapping from the client/application ID to its internal ID (i.e., map bound item ID to correlation ID). The LOB system can continue to work with its own identifiers (i.e., correlation ID) and not be forced to change its identifiers or mappings. Moreover, an algorithm according to embodiments may fill up all the bound information at a receiver by contacting the LOB system to supply the actual information corresponding to the communicated bound information identifiers. This enables the LOB system to apply the appropriate authorization and compliance rules before supplying any bound information to the receiver recognizing the fact that not all compliance/authorization rules exist in the user's client machine or application/solution business logic running on that machine.

A down-level solution/application behavior at the receiver for partially filled up bound information may be supported. This happens in the interim between the time a receiver obtains the bound-item identifiers communicated by the sender and the time the receiver obtains the full-bound-information corresponding to those identifiers from the LOB system. Thus, an algorithm according to embodiments may not require the solution or application behavior to specifically understand partially filled bound items. The bound item manager may intervene at the appropriate time when the solution tries to perform an action not supported for partially filled bound items. Additionally, status flags may be provided which the solution can use to prevent users from taking such actions. When the bound information is completely filled-up at the receiver, it may behave exactly as if the bound information was created by the receiver.

A bound item manager according to embodiments may works seamlessly with the client application/solution that is used for sharing unbound information between users. Hence, there for a new mechanism to share bound information may be eliminated as far as the end user experience is concerned. The end user may simply use his/her existing tools to send/forward bound information similar to sharing unbound information. The bound item manager may be configured to detect the kind of information being shared, and intervene where appropriate (e.g. send identifiers and other book-keeping data instead of actual information when the item is actually forwarded and/or shared). Similarly, on the receiver's end, the bound item manager may detect the kind of information being received and intervene where appropriate (e.g. determine whether the bound item is partially filled and contact the LOB system for data when appropriate).

Figure 3:
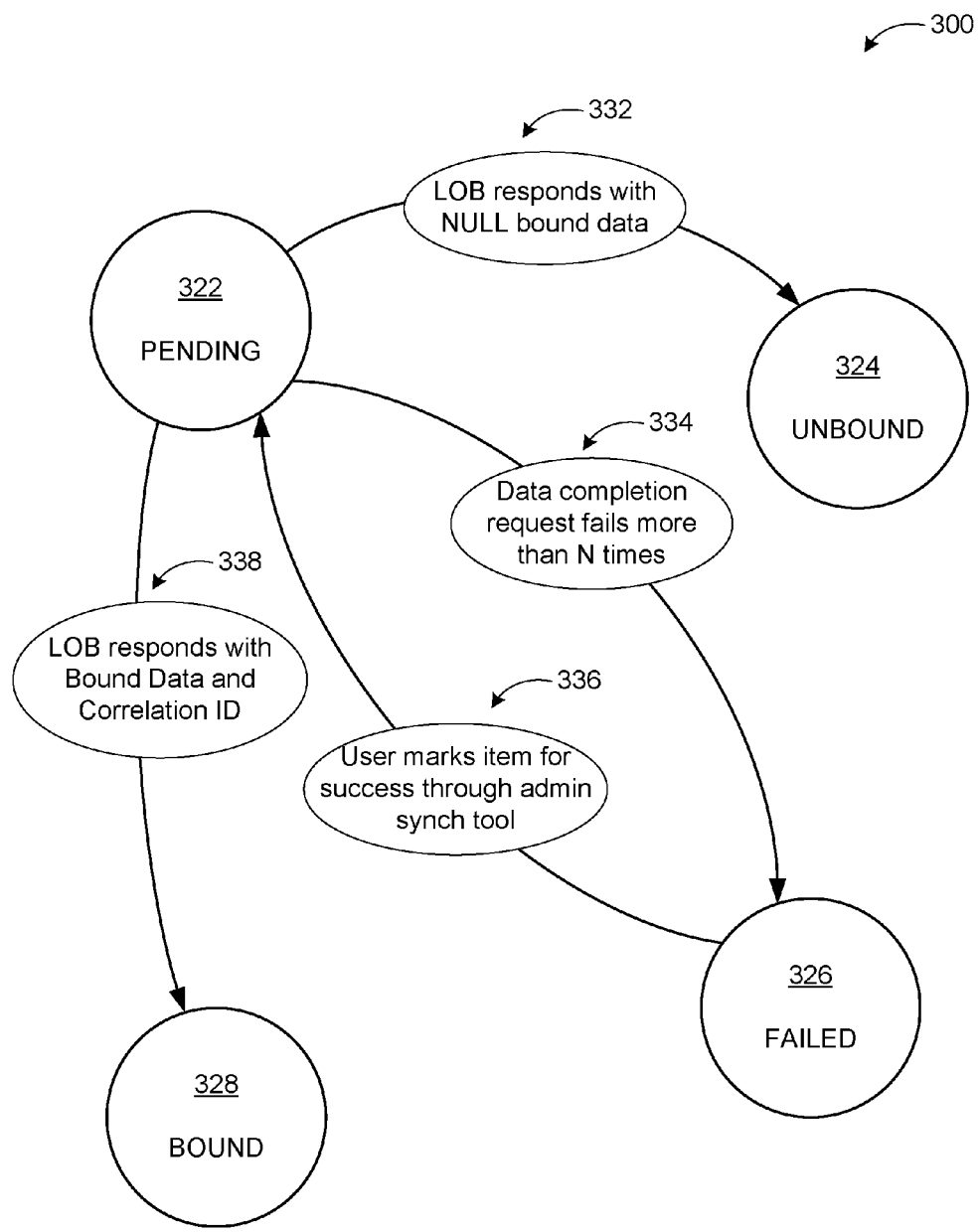
FIG. 3 illustrates different scenarios for bound and unbound items according to embodiments.

FIG. 3 illustrates different scenarios for bound and unbound items according to embodiments. According to embodiments, a sent bound item might be in any one of the four states ("pending" 322, "unbound" 324, "failed 326, or "bound" 328) in the receiver's client. These states are applicable to native bound items. Attachments to bound items may have to be made native items by the user before the flow below applies.

An item may be in "pending" state 322 when data completion is still pending. Such items may have a correlation ID of the sender property assigned to them in the client collaborative application. If the LOB responds with null bound data as indicated by reference numeral 332, the item is moved to "unbound" state 324. The correlation ID property of the item may be removed at this stage. This scenario may occur when the LOB does not believe there is anything to share between the sender and receiver (based on the receiver's role). This is not necessarily a failure of the web service. It may simply be a difference in behavior based on the bound information that the sender and the receiver are allowed to see by the LOB. This may also happen if the sender deletes the information from the LOB system before the receiver gets a chance to call the data completion web service. At this point, the LOB simply does not find any information corresponding to the receiver's correlation ID.

If the data completion is successful and the LOB responds with bound data and a correlation ID of the receiver as indicated by reference numeral 338, the item may be moved to "bound" state 328. The LOB's response has been successfully updated in the bound item. These items have the correlation ID of the receiver property.

If the data completion request cannot be completed and the item has failed synchronization as indicated by reference numeral 334, the item may be moved to a "failed" state 326. The data completion and synchronization attempts may be repeated up to a predefined threshold (e.g. "N" times). The correlation ID property may be retained and synchronization may have to be retried using administrative tools by the user. A warning may be issued to the user for this purpose as indicated by reference numeral 336.

On the sender's side, an algorithm executed by the bound item manager according to embodiments may couple to "send" or "forward" events in the client collaborative application and add the correlation ID of the sender for shareable items that are sent/forwarded. Furthermore, the user may be warned that the item would be unbound at the receiver's side if the correlation ID does not exist.

The four states and events leading to bound items being moved from one state to another are for illustration purposes only. Additional or fewer states and/or events may be employed without departing from a scope and spirit of the embodiments described herein.

Figure 4:
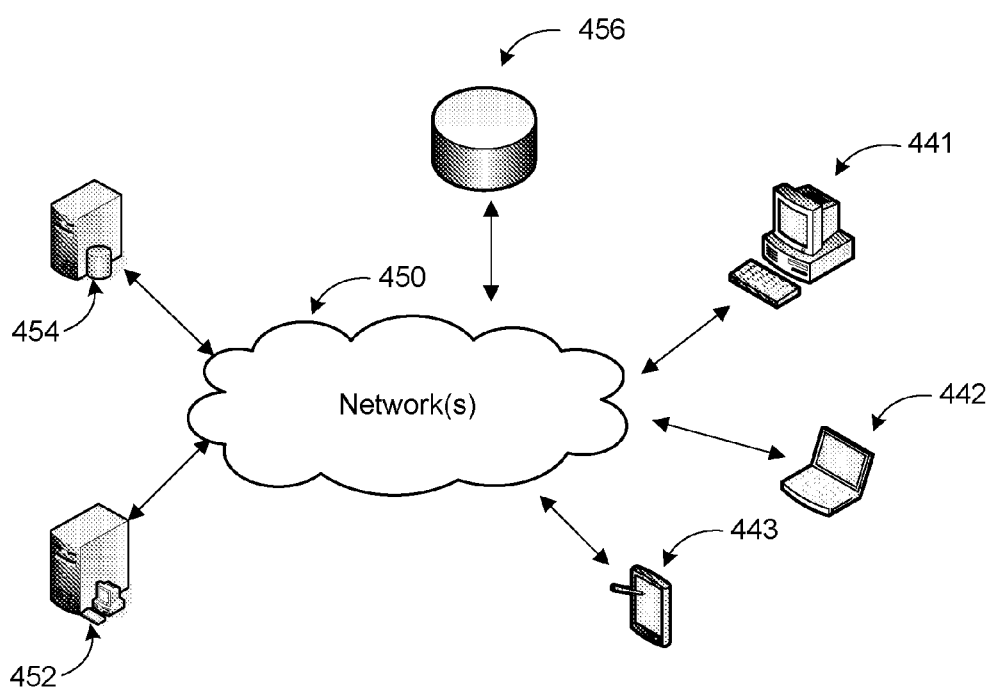
FIG. 4 is an example networked environment, where embodiments may be implemented.

FIG. 4 is an example networked environment, where embodiments may be implemented. Collaborative applications and LOB systems may be implemented locally on a single computing device or in a distributed manner over a number of physical and virtual clients and servers. They may also be implemented in un-clustered systems or clustered systems employing a number of nodes communicating over one or more networks (e.g. network(s) 450).

Such a system may comprise any topology of servers, clients, Internet service providers, and communication media. Also, the system may have a static or dynamic topology. The term "client" may refer to a client application or a client device. While a networked system implementing secure sharing of LOB bound information in client applications may involve many more components, relevant ones are discussed in conjunction with this figure.

A client (e.g. calendaring) application according to embodiments may be implemented in individual client devices 441-443 or executed in server 452 and accessed from anyone of the client devices (or applications). Similarly an LOB service associated with the client application may be executed locally in one of the client devices or, more typically, in one or more servers (e.g. server 452) and accessed by the client devices (or applications).

Data stores associated with providing secure sharing of LOB bound information may be embodied in a single data store such as data store 456 or distributed over a number of data stores associated with individual client devices, servers, and the like. Dedicated database servers (e.g. database server 454) may be used to coordinate data retrieval and storage in one or more of such data stores.

Network(s) 450 may include a secure network such as an enterprise network, an unsecure network such as a wireless open network, or the Internet. Network(s) 450 provide communication between the nodes described herein. By way of example, and not limitation, network(s) 450 may include wired media such as a wired network or direct-wired connection, and wireless media such as acoustic, RF, infrared and other wireless media.

Many other configurations of computing devices, applications, data sources, data distribution systems may be employed to implement providing secure sharing of LOB bound information in client applications. Furthermore, the networked environments discussed in FIG. 4 are for illustration purposes only. Embodiments are not limited to the example applications, modules, or processes.

Figure 5:
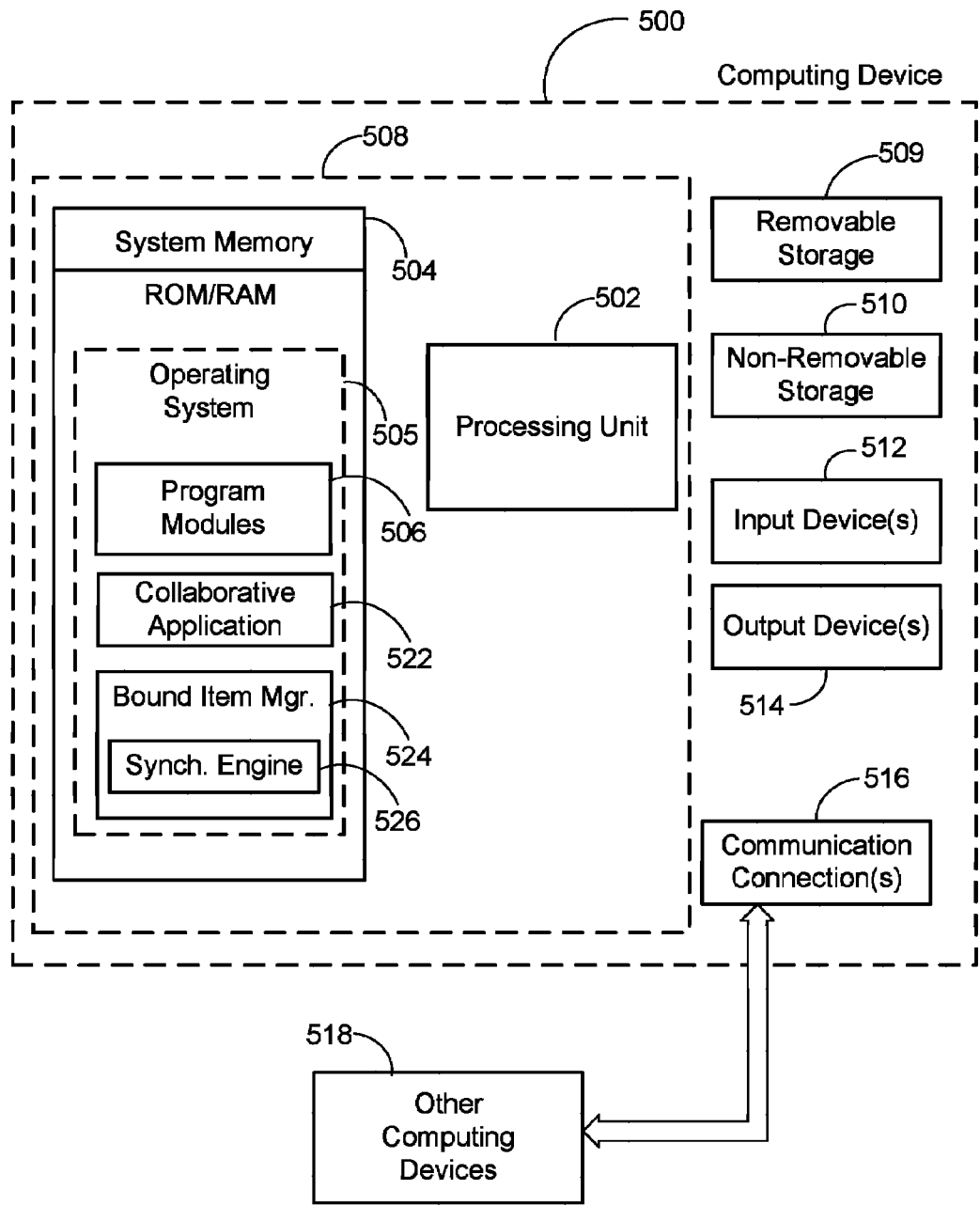
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment is illustrated, such as computing device 500. In a basic example configuration, the computing device 500 may be a client device providing collaborative application(s) in conjunction with an LOB service and typically include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of a networked personal computer, such as the WINDOWS® operating systems from MICROSOFT CORPORATION of Redmond, Wash. The system memory 504 may also include one or more software applications such as program modules 506, collaborative application 522, bound item manager 524, and synchronization module 526.

Collaborative application 522 may be a separate application or an integral module of a desktop service that provides calendaring, scheduling, messaging, and similar services to applications associated with computing device 500. Bound item manager 524 and synchronization module 526 may provide services associated with secure sharing of LOB bound information between clients of the collaborative application 522 and the LOB system. This basic configuration is illustrated in FIG. 5 by those components within dashed line 508.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer storage media may include volatile and non-volatile, removable and non-removable media implemented in any method or technology for storage of information, such as computer readable instructions, data structures, program modules, or other data. System memory 504, removable storage 509 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s) 512 such as keyboard, mouse, pen, voice input device, touch input device, etc. Output device(s) 514 such as a display, speakers, printer, etc. may also be included. These devices are well known in the art and need not be discussed at length here.

The computing device 500 may also contain communication connections 516 that allow the device to communicate with other computing devices 518, such as over a wireless network in a distributed computing environment, for example, an intranet or the Internet. Other computing devices 518 may include server(s) that execute applications associated with the backend LOB service. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
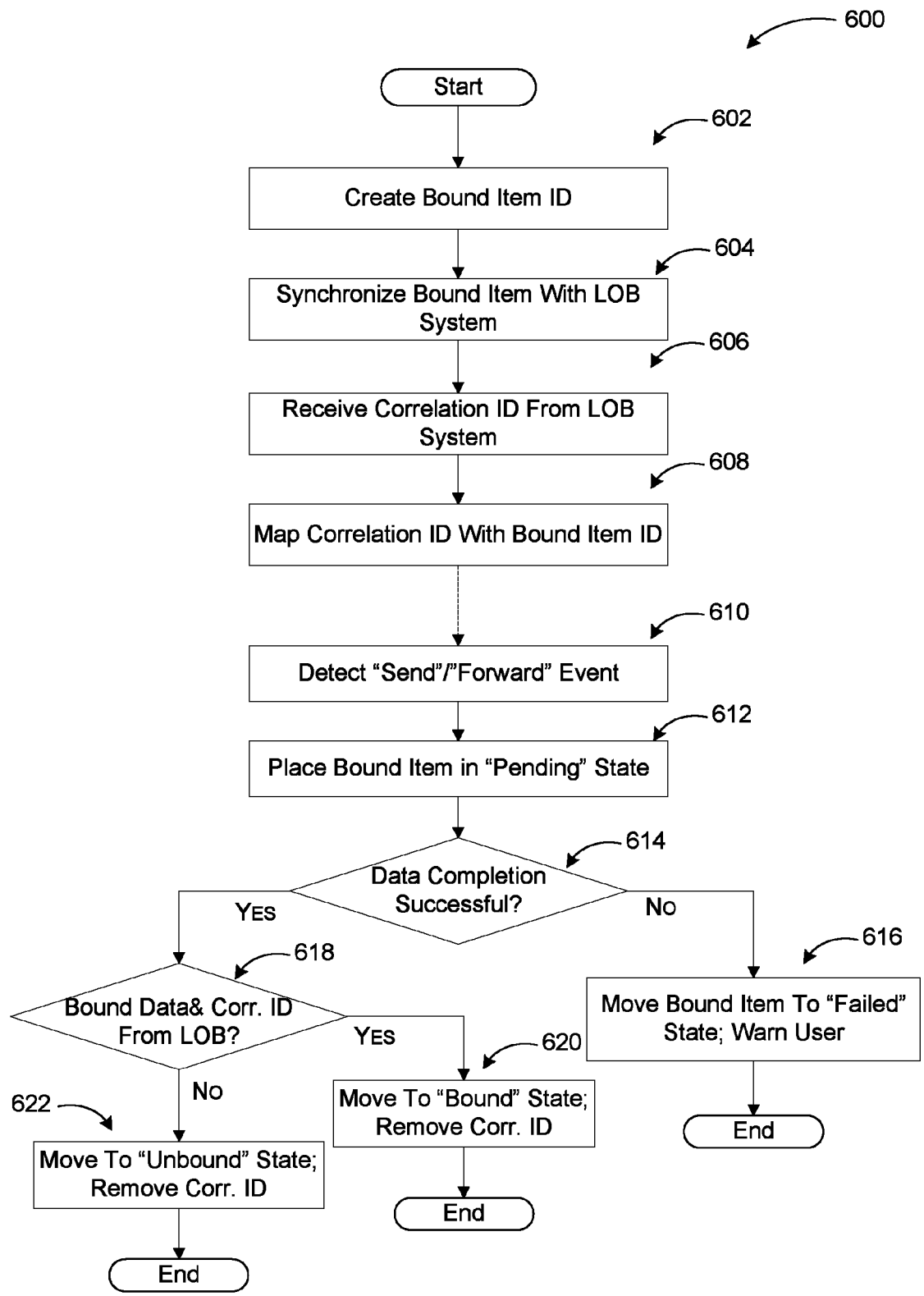
FIG. 6 illustrates a logic flow diagram for a process of securely sharing bound items in an LOB system using a collaborative application.

FIG. 6 illustrates a logic flow diagram for a process 600 of securely sharing bound items in an LOB system using a collaborative application. Process 600 may be implemented as part of a collaborative application in conjunction with a backend LOB system.

Process 600 begins with operation 602, where a bound item ID is created. The bound item ID may be associated with a bound item created by the client such as an appointment, a task, a meeting request, and the like. Processing advances from operation 602 to operation 604.

At operation 604, the bound item is synchronized with the backend LOB system, which upon successful synchronization issues a correlation ID. Processing continues to operation 606 from operation 604.

At operation 606, the correlation ID is received from the backend LOB system. Processing moves to operation 608 from operation 606.

At operation 608, the received correlation ID is mapped with the bound item ID of the original bound item created by the client. The sequence of actions described in operations 602-608 are from a client perspective. A similar sequence of actions may also occur from an LOB system perspective. If a bound item is created by the backend LOB system, the bound item manager would be notified receiving first the correlation ID, notifying the client application, and receiving a bound item ID upon creation of a corresponding bound item by the client application. The bound item manager may then map the two IDs.

Following operation 608, a system according to embodiments monitors client and LOB system activities. If a "Send" or "Forward" event is detected indicating an attempt to exchange bound information, processing advances to operation 610 from operation 608 as indicated by the dashed line in the figure.

At operation 610, the "Send" or "Forward" event is detected. These events are examples of actions by the client application indicating an exchange of bound information. Other types of events may also be used to indicate and facilitate exchange of bound information. A sender's correlation ID is added to the sent/forwarded item. Processing moves to operation 612 from operation 610.

At operation 612, the bound item being exchanged is placed in a "pending" state as described previously in conjunction with FIG. 3. Operation 612 and subsequent operations occur on a receiver side of the architecture. Processing moves to decision operation 614 from operation 612.

At decision operation 614, a determination is made whether data completion was successful or not. If the data completion fails, processing moves to operation 616 where the bound item is moved to a "failed" state and the user warned about the failure. The user may then use administrative tools to repeat the exchange attempt. If the data completion is successful, processing moves to decision operation 618.

At decision operation 618, a determination is made whether Bound data and correlation ID are received from the LOB system confirming the LOB system's permission of the exchange of bound information. If the bound data and the correlation ID are received, processing moves to operation 620 where the bound item is moved to a "bound" state and the correlation ID is removed. The exchange is successfully completed, and processing moves from operation 620 to a calling process for further actions.

If the bound data and correlation ID are not received, processing advances to operation 622 where the bound item is moved to an "unbound" state and the correlation ID removed. The user may be notified about the rejection of the exchange by the LOB system. After operation 622, processing moves to a calling process for further actions.

The operations included in process 600 are for illustration purposes. Providing secure sharing of LOB bound information in client applications may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing secure sharing of bound items between clients associated with a Line Of Business (LOB) service, the method comprising:
   in response to detecting an exchange attempt for a bound item, placing, by the computing device, the bound item in a pending state, the bound item comprising bound information, the bound information comprising identifiable information, with at least one of a unique name and an identifier, that is directly under the control of at least one of the clients and is simultaneously tracked and maintained by the LOB service;
   forwarding, by the computing device, the exchange attempt to the LOB service;
   if data transfer is successfully completed and affirmation is received from the LOB service, moving, by the computing device, the bound item to a bound state enabling a receiver to access the bound item and associated bound data;
   if data transfer is successfully completed but affirmation is not received from the LOB service, moving, by the computing device, the bound item to an unbound state preventing the receiver from accessing the bound data associated with the bound item; and
   if data transfer is not successfully completed, moving, by the computing device, the bound item to a failed state and notifying a sender attempting the exchange.

2. The method of claim 1, further comprising:
   receiving a client generated bound item ID assigned to a newly created bound item;
   synchronizing the bound item with the LOB service;

receiving a correlation ID from the LOB service in response to the synchronization wherein the client generated bound item ID is not understood by the LOB service and wherein the correlation ID is used as a parameter to identify the bound information; and mapping the correlation ID with the client generated bound item ID.

3. The method of claim 2, wherein the bound item ID and the correlation ID are used to notify the LOB service and receive the affirmation from the LOB service.

4. The method of claim 1, further comprising providing a warning to a user attempting the exchange that the bound item is to be modified to an unbound item at a receiver if a correlation ID does not exist at the LOB service.

5. The method of claim 1, wherein the affirmation from the LOB service includes bound data and a correlation ID.

6. The method of claim 5, further comprising removing the correlation ID upon moving the bound item to one of the bound and unbound states.

7. The method of claim 1, wherein the bound item includes encrypted information.

8. The method of claim 1, further comprising enabling the LOB service to apply a set of compliance and authorization rules to the exchange before affirming the exchange.

9. The method of claim 1, wherein access to the bound item in the pending state is restricted until the LOB affirmation is received.

10. The method of claim 1, further comprising enabling a web service to one of complete and refresh the bound item based on a client signature maintained by the web service.

11. The method of claim 1, wherein the bound item includes at least one from a set of: an appointment, a meeting request, a task, and an electronic message.

12. A system for providing secure sharing of bound items by a client application associated with an LOB service, the system comprising:
    a memory;
    a processor coupled to the memory, wherein the processor is configured to execute program modules including:
    a collaborative application to provide a user interface and maintain records associated with calendar items of a user, wherein a portion of the calendar items are bound items with extended LOB properties, the bound items comprising bound information, the bound information comprising identifiable information, with at least one of a unique name and an identifier that is directly under the control of the client application and is simultaneously tracked and maintained by the LOB service;
    a bound item manager module configured to:
    receive a client generated bound item ID assigned to a newly created bound item;
    receive a correlation ID from the LOB service in response to synchronizing the bound item, wherein the client generated bound item ID is not understood by the LOB service and wherein the correlation ID is used as a parameter to identify the bound information;
    map the correlation ID with the client generated bound item ID;
    place the bound item in a pending state in response to detecting an exchange attempt for the bound item;
    move the bound item to a bound state enabling a receiver to access bound data associated with the bound item in response to successful data completion and affirmation from the LOB service;
    move the bound item to an unbound state preventing the receiver from accessing the bound data in response to a successful data completion but lack of affirmation from the LOB service;
    move the bound item to a failed state and notifying a sender attempting the exchange in response to an unsuccessful data completion;
    request affirmation from the LOB system using the correlation ID and the bound item ID, wherein the LOB service determines whether to allow the exchange based on a set of authorization and compliance rules; and
    a synchronization module to synchronize bound items between the collaborative application and the LOB service.

13. The system of claim 12, wherein the bound item is exchanged as an entire object.

14. The system of claim 12, wherein the bound item manager maps the bound item ID and the correlation ID such that the LOB service is aware of the correlation ID only and the collaborative application is aware of the bound item ID only.

15. The system of claim 12, wherein the bound item manager is further configured to restrict access to a partially filled bound item at a receiver client.

16. The system of claim 12, wherein the correlation ID is a property attached to the bound item by the bound item manager during one of an exchange attempt and a synchronization attempt, and wherein the correlation ID is removed upon completion of the attempt.

17. A computer-readable storage medium with instructions stored thereon for securely sharing bound items between clients associated with an LOB service, the instructions comprising:
    receiving a client generated bound item ID assigned to a newly created bound item, the bound item comprising bound information, the bound information comprising identifiable information, with at least one of a unique name and an identifier, that is directly under the control of at least one of the clients and is simultaneously tracked and maintained by the LOB service;
    receiving a correlation ID from the LOB service in response to synchronizing the bound item, wherein the client generated bound item ID is not understood by the LOB service and wherein the correlation ID is used as a parameter to identify the bound information;
    mapping the correlation ID with the client generated bound item ID;
    placing the bound item in a pending state in response to detecting an exchange attempt for the bound item; and
    moving the bound item to a bound state enabling a receiver to access bound data associated with the bound item in response to successful data completion and affirmation from the LOB service;
    moving the bound item to an unbound state preventing the receiver from accessing the bound data in response to a successful data completion but lack of affirmation from the LOB service; and
    moving the bound item to a failed state and notifying a sender attempting the exchange in response to an unsuccessful data completion.

18. The computer-readable storage medium of claim 17, wherein the instructions further comprise:
    removing the correlation ID from the bound item in the pending state upon receiving one of the affirmation and lack of affirmation from the LOB.

19. The computer-readable storage medium of claim 17, wherein the exchange includes one of a send action and a forward action.

20. The computer-readable storage medium of claim 17, wherein the unbound item is inaccessible to the receiver in the pending state.

* * * * *